(12) United States Patent
Pipilikaki et al.

(10) Patent No.: US 11,396,479 B2
(45) Date of Patent: Jul. 26, 2022

(54) DRY PREMIXTURE FOR FLEXIBLE CONCRETE AND METHOD FOR ITS PREPARATION AND USE THEREOF

(71) Applicant: Nederlandse Organisatie voor toegepast-natuurwetenschappelijk onderzoek TNO, s-Gravenhage (NL)

(72) Inventors: Panagiota Pipilikaki, Voorburg (NL); Franky Flory Vercauteren, Eindhoven (NL); Mario Robert De Rooij, Rotterdam (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 275 days.

(21) Appl. No.: 16/622,672

(22) PCT Filed: Jun. 18, 2018

(86) PCT No.: PCT/NL2018/050395
§ 371 (c)(1),
(2) Date: Dec. 13, 2019

(87) PCT Pub. No.: WO2018/231062
PCT Pub. Date: Dec. 20, 2018

(65) Prior Publication Data
US 2021/0139375 A1 May 13, 2021

(30) Foreign Application Priority Data
Jun. 16, 2017 (EP) ..................... 17176434

(51) Int. Cl.
C04B 28/04 (2006.01)
C04B 14/28 (2006.01)
C04B 18/08 (2006.01)
C04B 24/26 (2006.01)
C04B 40/06 (2006.01)
C04B 103/00 (2006.01)

(52) U.S. Cl.
CPC .............. C04B 28/04 (2013.01); C04B 14/28 (2013.01); C04B 18/08 (2013.01); C04B 24/2623 (2013.01); C04B 40/0608 (2013.01); C04B 2103/0057 (2013.01)

(58) Field of Classification Search
CPC ..... C04B 14/28; C04B 18/08; C04B 24/2623; C04B 28/04; C04B 40/0608; C04B 2103/0057
See application file for complete search history.

(56) References Cited

U.S. PATENT DOCUMENTS

| 4,069,062 A | 1/1978 | Burge |
| 4,585,486 A | 4/1986 | Fujita et al. |
| 2001/0034391 A1 | 10/2001 | Eck et al. |
| 2003/0125404 A1 | 7/2003 | Hilton et al. |
| 2005/0250899 A1 | 11/2005 | Bacher et al. |
| 2018/0244909 A1 | 8/2018 | Weitzel et al. |

FOREIGN PATENT DOCUMENTS

| DE | 10109841 A1 | 9/2002 | |
| DE | 102014101519 A1 | 8/2015 | |
| DE | 102015203227 A1 | 8/2016 | |
| EP | 1134255 A2 | 9/2001 | |
| EP | 2341084 A1 | 7/2011 | |
| EP | 2690075 A1 | 1/2014 | |
| GB | 1490783 A | * 11/1977 | ............. C04B 28/04 |
| JP | 55158153 A | * 12/1980 | |
| JP | 58190884 A | * 11/1983 | |
| JP | 61091052 A | * 5/1986 | |
| JP | H06219795 A | 8/1994 | |
| JP | H06329457 A | 11/1994 | |
| JP | 2009256121 A | 11/2009 | |
| JP | 2013119497 A | 6/2013 | |
| KR | 920010182 B1 | * 11/1992 | |
| RU | 1835392 A1 | * 8/1993 | |
| WO | 02066395 A1 | 8/2002 | |
| WO | 2002066395 | 8/2002 | |
| WO | 2014052033 A1 | 4/2014 | |
| WO | 2014144642 A1 | 9/2014 | |

OTHER PUBLICATIONS

Sep. 25, 2018, International Search Report and Written Opinion, PCT/NL2018/050395.

* cited by examiner

Primary Examiner — Anthony J Green
(74) Attorney, Agent, or Firm — Banner & Witcott, Ltd.

(57) ABSTRACT

The invention relates to a cementitious powder blend comprising, based on total weight—45-90 wt % Portland cement; pref. 50-80 wt %—0-25 wt % siliceous fly ash; pref. 5-20 wt %—0-25 wt % limestone; pref. 5-20 wt %—5-30 wt % polyvinylalcohol, pref. 5-15 wt %. The PVA preferably has—a size distribution with $D_{10}$=170-270 μm, D50=370-450 μm. $D_{90}$=690-850 μm and $D_{100}$=1000-1300 μm; and—an ester value in the range of 1-250 mg KOH/g, as determinable by EN-ISO 3681:1998 and/or wherein the polyvinyl alcohol has a viscosity of a 4% aqueous solution at 20° C. in the range of 1-40 mPa·s, as determinable by EN-ISO 12058-1:2002. A substantial part of the PVA may be present in the form of hybrid particles composed of Portland cement and the polyvinylalcohol. Further, the invention relates to concrete composed of the cementitious powder blend, water and aggregate as well as flexible concrete products made therefrom. The cementitious powder blend is used for—for the preparation of a paving of a road or other infrastructural element; for the preparation of a base course for a road or other infrastructural element; for the manufacture of a floor of a building; for the repair of a concrete structure; for grouting; or—as an injection into a concrete structure.

23 Claims, 4 Drawing Sheets

DRY PREMIXTURE FOR FLEXIBLE CONCRETE AND METHOD FOR ITS PREPARATION AND USE THEREOF

CROSS-REFERENCE TO RELATED APPLICATIONS

This application is a U.S. National Stage application under 35 U.S.C. § 371 of International Application PCT/NL2018/050395 (published as WO 2018/231062 A1), filed Jun. 18, 2018, which claims the benefit of priority to Application EP 17176434.3, filed Jun. 16, 2017. Benefit of the filing date of these prior applications is hereby claimed. Each of these prior applications is hereby incorporated by reference in its entirety.

FIELD OF THE INVENTION

The invention relates to a cement powder blend, to a construction slurry, to a hardened construction slurry, in particular a hardened cement slurry, such as a hardened cement paste, to concrete that can be made using a cement powder blend according to the invention, and to a construction comprising concrete according to the invention.

BACKGROUND OF THE INVENTION

Concrete is a much used construction material for various types of constructions, including infrastructural constructions, such as roads, dams, lancing strips for airplanes etc., and buildings. Important characteristics include tensile strength, elasticity, ductility, thermal stability and material density. It is generally a challenge to improve on one characteristic without adversely affecting another characteristic. For example, a relatively low tensile strength and ductility of a concrete are usually counteracted by the inclusion of reinforcement, such steel or fibrous reinforcement materials. However, such reinforced concrete usually has a relatively low elasticity.

Concrete is typically made by curing an aqueous slurry of cement The slurry may contain other inorganic components, such as aggregate (such as sand or gravel). Further, organic additives may be included in the slurry. These can be included to facilitate handling of the slurry, or improve a property of the concrete.

E.g. U.S. Pat. No. 4,069,062 relates to additives for mortar and concrete to improve the plasticity, the workability or pumping properties of mortar and concrete in the form of aqueous dispersions. It teaches away from using additives in the powder state.

U.S. Pat. No. 4,585,486 relates to a process for preparing a cement composition wherein a viscosity increasing agent, e.g. a polyvinylalcohol (PVA), is added to a fluid cement composition . This agent acts as a debubbling agent to remove only large size bubbles from the fluid composition, which bubbles would adversely affect the strength of the cement mass after hardening.

WO2002/066395 relates to a building material that is produced by mixing a cementitious material, a PVA bonding agent, coated fly ash and/or elastomeric beads with water to form a slurry and allow the slurry to hydrate and set.

SUMMARY OF THE INVENTION

There remains a need for alternative cement composition to prepare concrete from, in particular a cement composition that is suitable to prepare a construction slurry, in particular a cement slurry, such as a cement paste, from with a relatively low viscosity preferably in combination with a relatively low shrinking degree upon hardening and/or a relatively low permeability after hardening and/or a relatively high ductility after hardening and/or a relatively high thermal stability after hardening. It further desired that such cement composition is suitable to prepare a concrete from with a relatively high flexibility (low E-modulus). It would in particular be desirable to provide such alternative which can be used without the need for reinforcing materials such as reinforcing steel or fibres and/or that has a relatively high flexiblity without the need for including a phase of an elastomeric material. Further it would be desirable to provide such alternative which also has a good resistance to fatigue and/or a good shear strength between a layer of the concrete and a layer of a different construction material, e.g. asphalt, on top or below the concrete.

It has now been found possible to provide a cement powder blend that fulfils such need.

Accordingly, the invention relates to a cement powder blend comprising, based on total weight
  45-90 wt. % Portland cement;
  0-25 wt. % siliceous fly ash;
  0-25 wt. (N) limestone; and
  5-30 wt. % polyvinylalcohol (PVA).

Further, the invention relates to a cement powder blend comprising Portland cement and PVA, wherein the PVA has a size distribution with $D_{10}$=170-270 µm, $D_{50}$=370-450 µm, $D_{90}$=690-850 µm and $D_{100}$=1000-1300 µm; an ester value in the range of 1-250 mg KOH/g, as determinable by EN-ISO 3681:1998, in the range of 5 160 mg KOH/g., preferably in the range of 7-150 mg KOH/g, in particular 7-10 mg KOH/g or 130-150 mg KOH/g and/or the PVA has a viscosity of a 4% aqueous solution at 20° C., as determinable by EN-ISO 12058-1:2002, in the range of 1-40 mPa·s in particular in the range of 1-6 mPa·s of or in the range of 25-30 mPa·s. Said cement powder blend further preferably comprises fly ash, most preferably siliceous fly ash, and/or limestone, preferably in amounts as specified in the present claims and/or description.

The total of Portland cement, fly ash (preferably siliceous fly ash), limestone and PVA in the cement powder according to the invention is typically 75-100 wt. %, preferably 80-100 wt. %, more preferably 90-99.5 wt. %, in particular 95-99.0 wt. %.

Further, the invention relates to a method for preparing a cement powder blend according to the invention, comprising dry-blending polyvinylalcohol particles, Portland cement particles and—if desired—one or more other ingredients, such as the fly ash, and the limestone.

The invention further relates to a construction slurry, in particular a cement slurry, such as a cement paste, made with a cement powder blend according to the invention.

The invention further relates to a hardened construction slurry, in particular a hardened cement slurry, such as a hardened cement paste, wherein at least a substantial part of the polyvinyl alcohol is present in the form of hybrid particles composed of Portland cement and polyvinylalcohol. This is e.g. illustrated in FIGS. 2A and 2B. The hybrid particles are formed in a method according to the invention. The PVA forms a (physical) bond with a calcium phase, such as the cement and/or limestone. This is done in the presence of water. This is, e.g., achieved when mixing the cement powder blend with water to obtain the slurry, in particular a cement paste, and curing it. Thus, in a particularly preferred embodiment, the hybrid particles comprises one or more portlandite phases bound with one or more polymer phases.

The invention further relates to concrete, preferably obtainable by curing (hardening) a construction slurry, in particular a cement slurry, such as a cement paste, according to the invention.

The weight to weight ratio water to the Portland cement of a slurry, paste according to the invention, usually is in the range of 0.2-0.7, preferably in the range of 0.4-0.6.

Usually, the concrete according to the invention is composed of at least a powder blend (having been formulated into a cement paste) according to the invention and aggregate. Preferably the hardened cement paste provides 5-40 wt. % of the total weight of the concrete and the aggregate 60-90 wt. %. The balance is usually water and optionally one or more additives for concrete (which are known per se).

The invention further relates to a product (e.g. a construction) comprising concrete according to the invention, preferably a product selected from the group consisting of infrastructural elements, such as roads, parking terrains, airplane-landing strips, railway embankments, sound barrier walls and sewers; buildings, such as parking garages, industrial buildings, storage halls, retail centers, residential buildings; concrete ware, such as concrete pipes (e.g. sewer pipes); and elements for pre-fab buildings, such as pre-fab walls, pre-fab floors, pre-fab ceilings.

The invention further relates to the use of a cement powder blend according to the invention or a construction slurry, in particular a cement slurry, such as a cement paste, according to the invention for the preparation of a paving of a road or other infrastructural element; for the preparation of a base course for a road or other infrastructural element; for the manufacture of a floor of a building; for the repair of a concrete structure; for grouting; or as an injection into a concrete structure.

As illustrated by the Examples, the invention provides a hardened cement slurry (paste), with reduced shrinkage upon curing and a concrete with reduced E-modulus.

Further, it has been found that a concrete according to the invention can be combined well in a (composite) construction with other materials, e.g. asphalt or a different concrete. In particular the shear strength at the interface between the concrete and another material, such as asphalt, has been found advantageous. Further, fatigue resistance properties (as can be determined by NEN-EN 12697-24) are good also under changing environmental conditions, such as changing weather conditions.

DETAILED DESCRIPTION OF THE INVENTION

Figure 1:
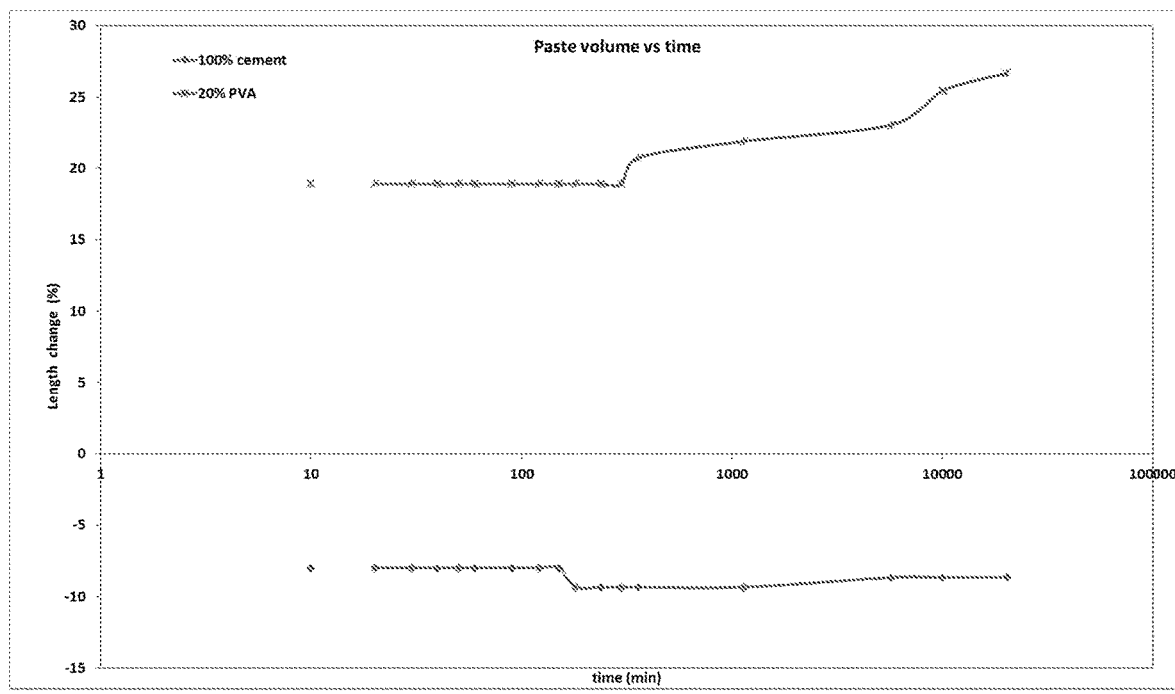
FIG. 1 shows the shrinkage of a cement formulation according to the invention and a reference formulation.

Unless defined otherwise, all technical and scientific terms used herein have the same meaning as commonly understood by one of ordinary skill in the art.

The term "or" as used herein means "and/or" unless specified otherwise.

The term "a" or "an" as used herein means "at least one" unless specified otherwise.

The term "substantial(ly)" or "essential(ly)" is generally used herein to indicate that it has the general character or function of that which is specified. When referring to a quantifiable feature, these terms are in particular used to indicate that it is for at least 75%, more in particular at least 90%, even more in particular at least 95% of the maximum of that feature.

As used herein, percentages are usually weight percentages unless specified otherwise. Percentages are usually based on total weight, unless specified otherwise.

When referring to a "noun" (e.g. a compound, an additive etc.) in singular, the plural is meant to be included, unless specified otherwise.

When referring herein to a particle size distribution 'Dx' the x refers to the particle diameter corresponding to x % cumulative (from 0 to 100%) undersize particle size distribution. In other words, if particle size $D_x$ is y μm, x% of the weight in the tested sample is provided by particles smaller than y μm, or the weight percentage of particles smaller than y μ is x %. $D_{10}$, $D_{50}$, $D_{90}$ and $D_{100}$ are typical points in particle size distribution analysis.

The term 'slurry; is generally known in the art to describe mixtures of a fluid in which a particulate (e.g. pulverised) material in dispersed that (in unhardened state) is flowable or pumpable. For 'cement slurry', the term 'cement paste' is also commonly used in the art, because generally cement slurries are pasty. The cured (hardened) product of the cement slurry or paste is usually referred to as hardened cement slurry or paste, although the adjective 'hardened' may be omitted when it is clear from the context that the slurry or paste has solidified.

For the purpose of clarity and a concise description features are described herein as part of the same or separate embodiments, however, it will be appreciated that the scope of the invention may include embodiments having combinations of all or some of the features described.

The cement powder blend preferably contains at least 50 wt. % Portland cement. The Portland cement content of the cement powder blend preferably is 80 wt. % or less, more preferably 75 wt. % or less, in particular 65 wt. % or less, more in particular 60 wt. % or less. Particularly good results have been achieved Portland cement meeting the NEN-EN 197-1 standard of October 2011, of which the contents are incorporated by reference.

The siliceous fly ash content of the cement powder blend usually is at least 5 wt. % preferably at least 10 wt. %. The siliceous fly ash content preferably is 20 wt. % or less. The siliceous fly ash is typically non-coated. This is advantageous because siliceous fly ash —in uncoated state—has pozzolanic properties and thereby contributes to the cementitious properties of the cement powder. As an alternative or in addition calcareous fly ash may be present, with the proviso that the total fly ash content does not exceed 25 wt. %.

The limestone content of the cement powder blend usually is at least 5 wt. %, preferably at least 10 wt. %. The limestone content preferably is 20 wt. % or less. Like Portland cement, limestone contains calcium. In accordance with the invention, it has been found that PVA and a calcium bearing material can react to form a matrix of PVA and the calcium bearing material. In particular, the presence of limestone has been found advantageous to reduce shrinkage of a material according to the invention.

The cement powder blend preferably comprises 25 wt. % PVA or less, more preferably 20 wt. % PVA or less, most preferably 15 wt. % PVA or less. In a particularly preferred embodiment, the PVA content of the cement powder blend is at least 6 wt. %, in particular at least 7 wt. %, more in particular at least 8 wt. %.

The PVA in the cement powder blend or used for preparing the cement powder blend usually has a $D_{10}$ of 300 μm or less, preferably in the range of 170-270 μm. $D_{50}$ is usually 500 μm or less, preferably in the range of 370-450 μm. $D_{90}$ is usually 900 μm or less, preferably in the range of 690-850 μm. $D_{100}$ is usually less than 1500 μm, preferably in the range of 1000-1300 μm. The values are measured using laser diffraction (also known as (Near) Forward Light Scattering, Low Angle Laser Light Scattering or Fraunhofer Diffraction).

The PVA usually has an average molecular weight (Mw) in the range of 25000-155000 g/mol. Preferably, the Mw is at least 2 7000 g/mol, in particular at least 29000 g/mol. Preferably the Mw is 150000 g/mol or less, e.g. 145000 g/mol or less. In particularly preferred embodiment the PVA has an Mw in the range of 29,000-32,000 g/mol or in the range of 140,000-150,000 g/mol. The Mw can be determined, for instance with size exclusion chromatography in an aqueous buffer, using Mowiol® as calibration standards. Mowiol® is available from Sigma-Aldrich (a Merck subsidiary). Mowiol® 4-88 represents an Mw of 31000 g/mol; Mowiol® 10-98 represents an Mw of 61000 g/mol; Mowiol® represents an Mw of 130000 g/mol.

The PVA usually has a hydrolysis degree of 99% or less. The PVA usually has a hydrolysis degree of more than 75%, preferably of at least 85%, more preferably of at least 87%. In a particularly preferred embodiment the PVA has a hydrolysis degree in the range of 87-89% or 98-99%. Herein Mowiol® can be used as calibration standards.

The polyvinyl alcohol usually has an ester value in the range of 1-250 mg KOH/g, as determinable by EN-ISO 3681:1998. Preferably, the ester value of the PVA is in the range of 5 160 mg KOH/g., more preferably in the range of 7-150 mg KOH/g, in particular in the range of 7-10 mg KOH/g or 130-150 mg KOH/g.

The PVA usually has a viscosity of a 4% aqueous solution at 20° C., as determinable by EN-ISO 12058-1:2002, in the range of 1-40 mPa·s in particular in the range of 2-30 mPa·s. In particular good results have been achieved with a PVA having a viscosity in the range of 1-6 mPa·s or in the range of 25-30 mPa·s.

As an optional component, the cement powder blend may comprise a plasticizer, usually a polycarboxylic ether plasticizer, preferably a modified polycarboxylic-ether. The content of polycarboxylic ether plasticizer usually is in the range of 0-6 wt. %, preferably in the range of 0.5-5 wt. %, more preferably in the range of 1.0-4 wt. %, based on the weight of the Portland cement.

The cement powder blend can be made be dry-blending the components. This can be done in generally known equipment under ambient conditions.

The construction slurry, in particular the cement slurry, such as the cement paste, can be made from the cement powder blend according to the invention by mixing with water in a manner known per se. The resultant slurry, such as the paste, can thereafter by used in a manner known per se for any application of interest, in particular in the production of a concrete according to the invention, as mortar or for a use specified elsewhere herein. For the production of concrete, typically aggregate is added to the construction slurry, such as the paste. The aggregate may be fine aggregate (particle size <4 mm), coarse aggregate (particle size 4-20 mm) or a combination thereof. It is an advantage of the invention that the concrete can be free of steel reinforcement materials and/or fibrous reinforcement materials (such as polymeric fibres). However, if desired, the concrete can contain such reinforcement material.

In a preferred embodiment, the hardened slurry, such as the hardened cement paste, according to the invention, has an expansion of 0-25% determined with sample length measurements (as described in Example 1) during curing (i.e. hardening) at 60° C.

In a preferred embodiment, the hardened slurry, such as the hardened cement paste, according to the invention has a stiffness of 0.5-1.5 N/mm² measured by means of direct tensile strength at 28 days.

The concrete according to the invention preferably is composed of 6-24 wt. % cement powder blend according to the invention.

The concrete according to the invention preferably comprises 4-16 wt. % water.

The concrete according to the invention preferably comprises 20-50 wt. % fine aggregates (0-4 mm) and/or 35-60 wt. % coarse aggregates (4-20 mm), with the proviso that the total aggregate content is 60-90 wt. %.

The invention will now be illustrated by the following examples.

EXAMPLE 1

Formulation with Low Shrinkage

A formulation with 20 wt. % of polyvinyl alcohol with ester value of 8 mg KOH/g, viscosity 28 mPa·s (of a 4% solution in water at 20 ° C.) and $D_{10}$=233 μm, $D_{50}$=440 μm, $D_{90}$=767 μm and $D_{100}$=1132 μm combined with 80% CEM I 42.5 cement was prepared. The resultant powder blend was mixed with water (in a weight to weight ratio water to powder blend of 0.6) to form a cement slurry (cement paste) at 60° C. The mixture was fully sealed and with water on the surface and cured. Shrinkage of the hardened cement slurry was determined by means of length change measurements using a micrometer. The results of the test are presented at FIG. 1. Results for a composition according to the invention (top) are compared with the results of CEM I 42.5 (bottom).

EXAMPLE 2

Formulation with Low Stiffness

A formulation with 7 wt. % of polyvinyl alcohol with ester value of 8 mg KOH/g, viscosity 28 mPa·s (of a 4 (N) solution in water at 20 ° C.) and $D_{10}$=233 μm, $D_{50}$=440 μm, $D_{90}$=767 μm and $D_{100}$=1132 μm combined with 60 wt. % cement CEM I 42.5, 19 wt. % limestone and 14 wt. % fly ash was prepared. The resultant powder blend was mixed with water (in a weight to weight ratio water to powder blend of 0.6) to form a cement slurry (cement paste) at 20° C. The mixture was fully sealed with water on the surface and cured . up to 28 days. Then the direct tensile strength of the hardened cement slurry was determined (following AASHTO T314-07) and stiffness was calculated from the strain-stress diagrams. The results of the test are presented at Table 1 and compared with the results of CEM I 42.5.

TABLE 1

Results of stiffness calculation

|  | E (N/mm$^2$) | Std |
|---|---|---|
| CEM I 42.5 | 1.520 | 0.11 |
| Formulation with PVA | 0.891 | 0.09 |

Example 3

Demonstration of Physical Bond Between Cement Calcium Phases and Polyvinyl Alcohol A formulation with 7 wt. % of polyvinyl alcohol with ester value of 8 mg KOH/g, viscosity 28 mPa·s (of a 4% solution in water at 20 °C.) and $D_{10}$=233 µm, $D_{50}$=440 µm, $D_{90}$=767 µm and $D_{100}$=1132 µm combined with 60 wt. % cement CEM I 42.5, 19% limestone and 14 wt. % fly ash was prepared. The sample was cured after mixing at 60° C. with water (in a weight to weight ratio water to powder blend of 0.6) and fully sealed with water on the surface up to 28 days.

Figure 2A:
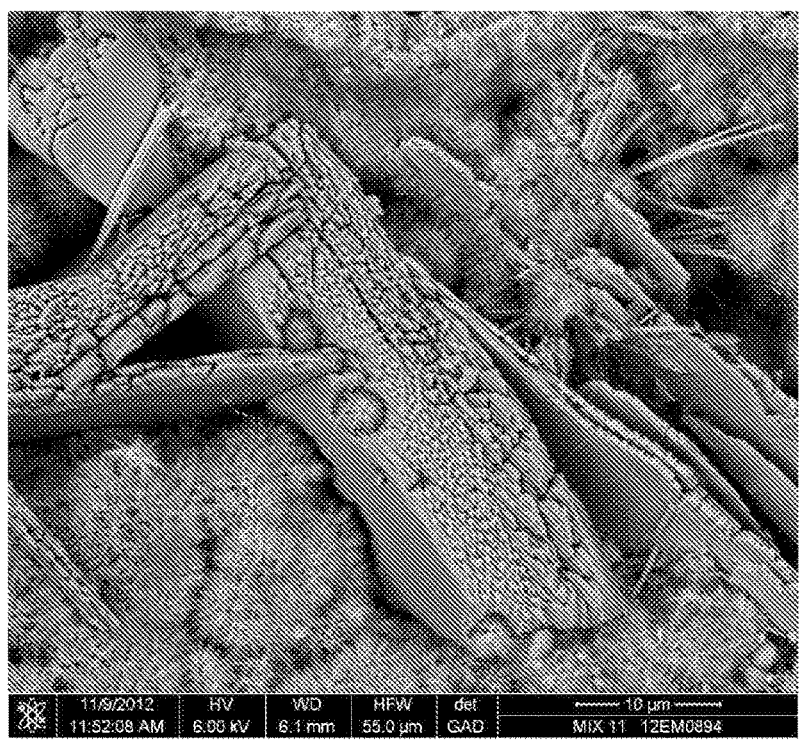
FIGS. 2A and 2B show SEM images of a cured sample of a cement formulation.
Figure 2B:
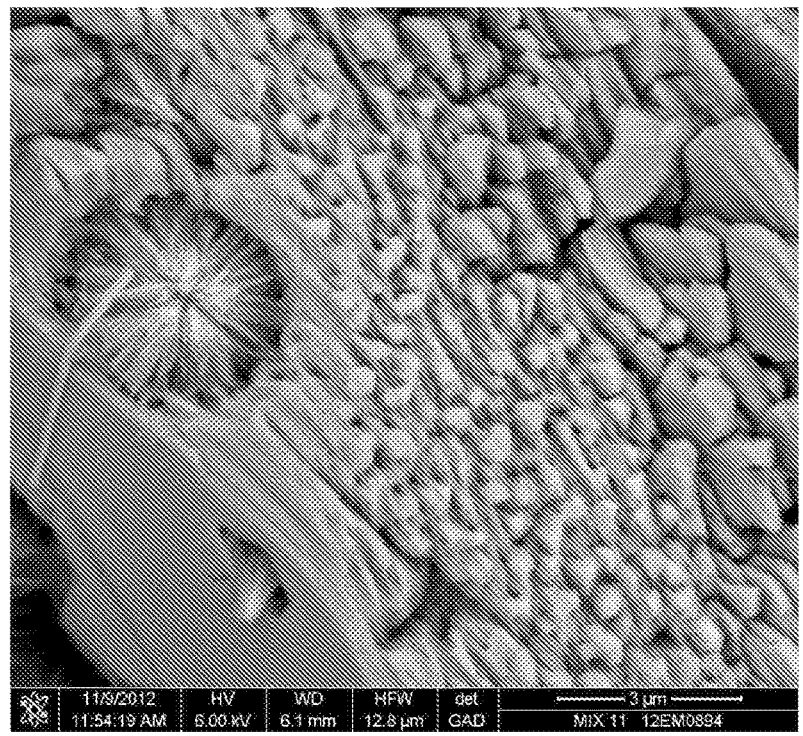

Then the cured sample was examined by means of SEM microscopy. The results are presented in FIGS. 2A and 2B. What is noticed is that there are portlanclite phases bound with polymer phases.

Example 4

Comparison of Cement Paste According to the Invention with a Standard Cement Paste on Properties Relevant for Paving Application Direct tensile strength (AASHTO T314-07) tests were performed after 28 days of water curing.

Stiffness was determined by means of four point bending test (NEN-EN 12697-26) on concrete samples after 28 days of water curing for three different temperatures T=−10, 5 and 20° C. The test were performed on 50×50×450 mm prisms.

Fatigue was measured by means of four point bending (NEN-EN 12697-24) on concrete samples at 30 Hz, using different strain levels (90,120,180 and 210 microstrain) at 20° C. The tests were performed on 50×50×450 mm prisms.

Leutner shear test was performed on asphalt—concrete samples for two different temperatures according to standard prEN 12697-48:2011 after 28 days of water curing. Test samples were made by casting 6 cm concrete on an asphalt concrete plate and using cores of 10 cm diameter from the combination plate for the test.

Compressive and bending strength was measured on standard cement mortars according to EN 196-1 after 1, 2, 7 and 28 days. The strain-stress diagrams were acquired and stiffness was calculated.

Table 2 shows the Average Results of the direct tensile strength test.

TABLE 2

|  | Tensile strength (MPa) | dL at Fmax (mm) | Stiffness (N/mm2) |
|---|---|---|---|
| Reference | 2.16 | 0.12 | 1.4 |
| cement paste according to the invention (flexible paste) | 2.20 | 0.26 | 0.8 |

Figure 3:
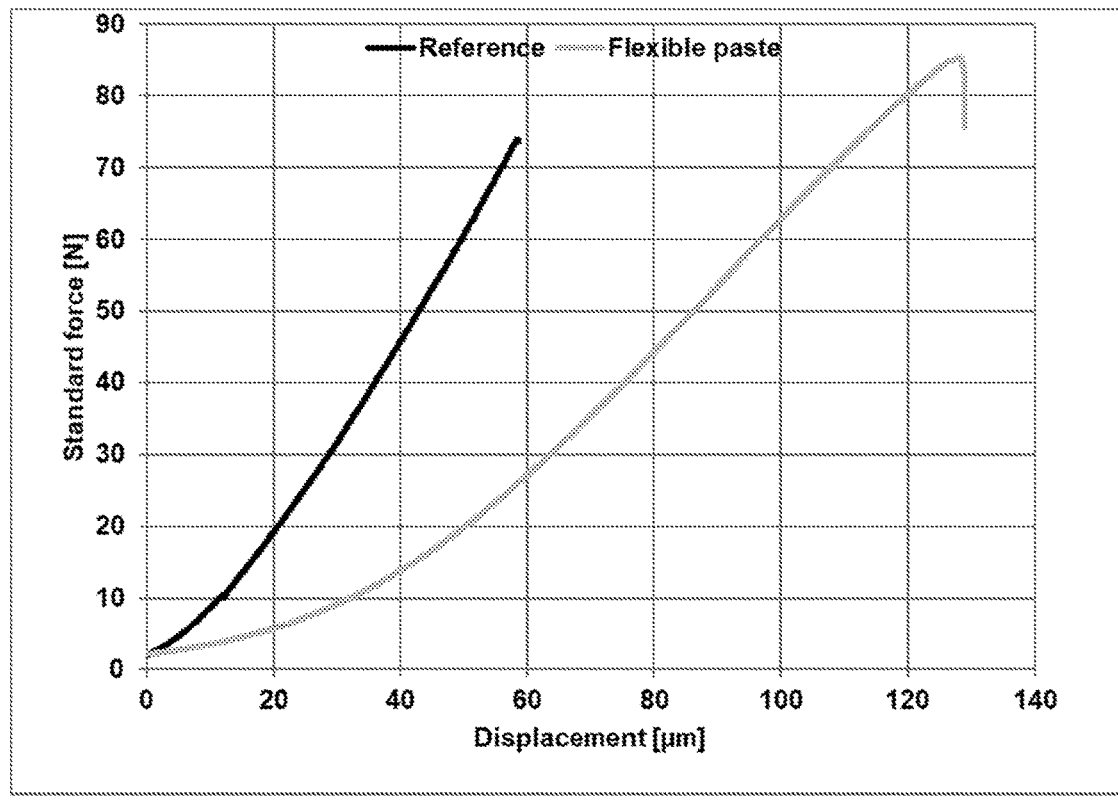
FIG. 3 shows the ductile fracture behavior for a cement paste of the invention and a reference cement paste.

The results show that cement paste according to the invention exhibits lower stiffness while it can elongate (dL) more than twice as the reference cement paste before failure occurs. This is an indication that the material has a ductile fracture behaviour, which behaviour was confirmed by a plotting a force-displacement diagram (FIG. 3, reference at the left, flexible paste according to the invention at the right).

Figure 4:
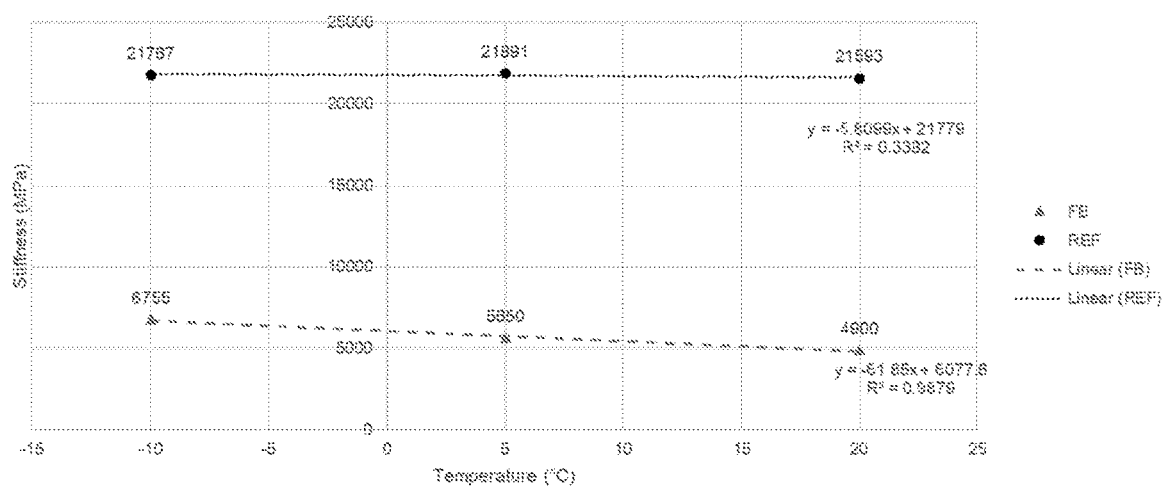
FIG. 4 shows the stiffness-temperature dependency for a concrete of the invention and a reference concrete.

The diagram in FIG. 4 shows the stiffness-temperature dependency at 8 Hz (reference=top line, concrete according to the invention=bottom line) using the 4 point bending test. The dependency between stiffness and temperature is higher compared to conventional concrete with a difference of approximately 1800 MPa between low temperature (−10° C.) and high temperature (20° C.). Compared to asphalt, the stiffness of a concrete according to the invention varies less as a function of temperature a lower dependency on temperature. In this respect it can thus can be seen as a product category on its own.

Figure 5:
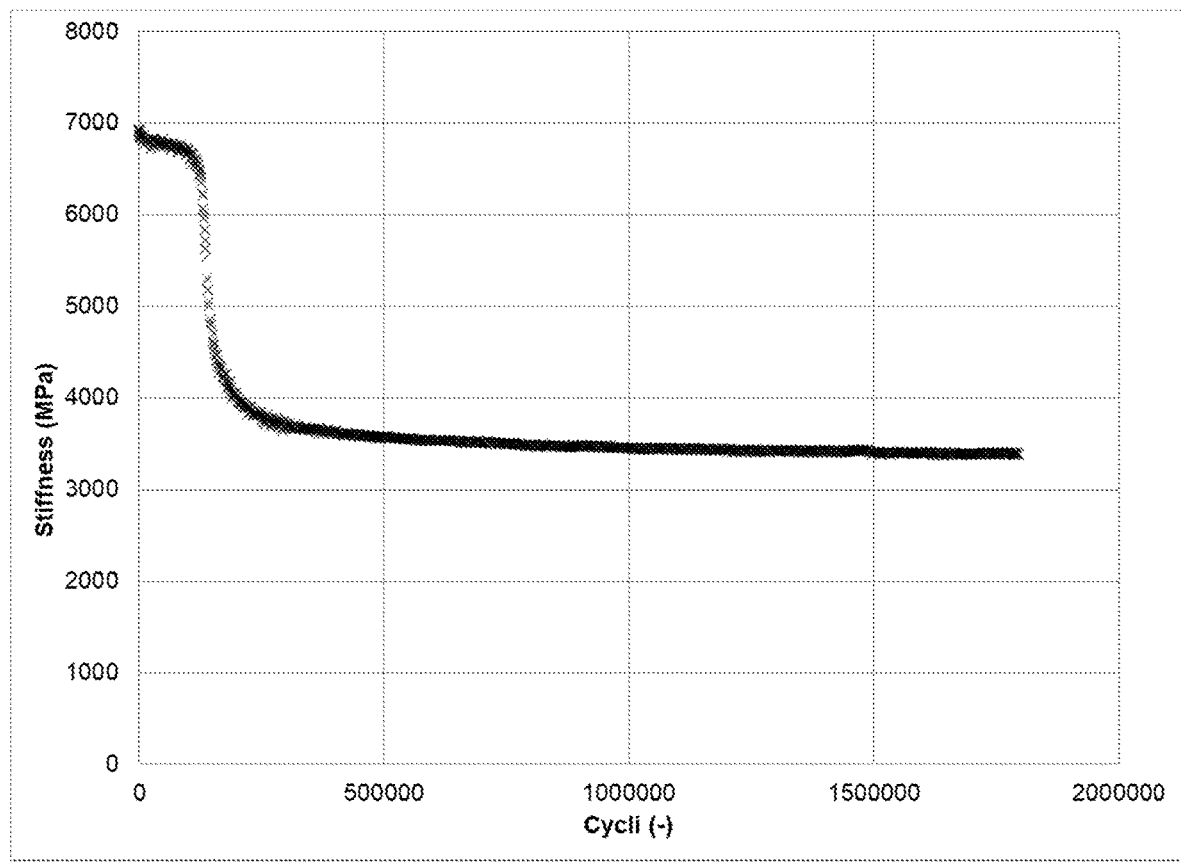
FIG. 5 shows fatigue behavior for a concrete of the invention.

An interesting aspect describing the behaviour of the flexible concrete according to the invention in fatigue is that there was an initial drop in stiffness after only a few cycles. Thereafter the samples endured many more cycles until the test was stopped without significant change in stiffness. The sample after this test was intact and no cracks were detected. This behaviour is illustrated for a sample tested at 120 micro-strain in FIG. 5.

The Leutner shear test results showed an average shear strength of 2.01 MPa at 10° C. and of 1.53 MPa at 20° C. The two layers had a good adhesion and the shear strength was higher than the requirement for thin coating; i.e. a tensile strength at 10° C. of 1.5 MPa.

In summary, from the results of the various tests it was concluded that a flexible concrete according to the invention (made using a powder blend according to the invention) has a ductile behaviour in all different mixes tested: paste, mortar and concrete. This property distinguishes the flexible concrete from normal concrete mixes. The ductility presented can have an effect in how a road is constructed and allow for less or no joints that will increase driving comfort. This property will not compromise the environmentally friendly aspect of concrete roads as the material remains a cement based material.

Another important property of the flexible concrete is that the ductility is not directly connected to its strength which allows strength optimization without sacrificing the ductile character. This is also not common for normal concrete where there is a relationship between mechanical properties and elasticity. The flexible concrete presented an excellent fatigue performance which indicates that a pavement can withstand a lot of cycles of loading and unloading before failure occurs. This means that the flexible concrete has good durability allowing less repairs. A combination of this property with high durability expected due to cementitious character of the flexible concrete makes it an excellent option for pavements.

The stiffness of the flexible concrete lies in the area of asphalt instead in that of concrete and there is some dependency with temperature and frequency but it is less strong than for asphalt. This means that Flexible concrete will be less sensitive to temperature variation.

Usage of this material can vary as it has a good affinity both with concrete and with asphalt. This would allow usage in different pavement layers on top of already existing layers as a combination layer or even as a repair material.

The invention claimed is:

1. A cement powder blend comprising, based on total weight
   45-90 wt. % Portland cement;
   0-25 wt. % siliceous fly ash;
   0-25wt. % limestone; and
   5-30wt. % polyvinylalcohol,
   wherein the polyvinylalcohol has a size distribution with $D_{10}$=170-270 µm, $D_{50}$=370-450 µm, $D_{90}$=690-850 µm and $D_{100}$=1000-1300 µm; or an ester value in the range of 1-250 mg KOH/g, as determined by EN-ISO 3681: 1998; or a viscosity of a 4% aqueous solution at 20° C. in the range of 1-40 mPa·s, as determined by EN-ISO 12058-1:2002.

2. The cement powder blend according to claim 1, comprising
   50-80 wt. % Portland cement;
   5-20 wt. % siliceous fly ash;
   5-20 wt. % limestone; and
   5-15 wt. % polyvinylalcohol.

3. The cement powder blend according to claim 1, wherein the polyvinyl alcohol has an ester value in the range of 7-150 mg KOH/g.

4. The cement powder blend according to claim 3, wherein the polyvinyl alcohol has an ester value in the range of 7-10 mg KOH/g.

5. The cement powder blend according to claim 3, wherein the polyvinyl alcohol has an ester value in the range of 130-150 mg KOH/g.

6. A method for preparing a cement powder blend according to claim 1, the method comprising dry-blending the polyvinylalcohol, the Portland cement, the fly ash and the limestone.

7. A construction slurry of the cement powder blend according to claim 1 and water in a weight to weight ratio water to the Portland cement in the range of 0.2-0.7.

8. The construction slurry according to claim 7, wherein the construction slurry is a cement slurry.

9. A hardened construction cement slurry of the cement powder blend according to claim 1.

10. The hardened construction cement slurry according to claim 9, wherein at least a substantial part of the polyvinyl alcohol is present in the form of hybrid particles composed of Portland cement and polyvinylalcohol.

11. The hardened construction cement slurry according to claim 9, having an expansion of 0-25% determined with sample length measurements during curing at 60° C.

12. The hardened construction cement slurry according to claim 9, having a stiffness of 0.5-1.5 N/mm² measured by means of direct tensile strength at 28 days.

13. Concrete composed of a cement powder blend according to claim 1, aggregate and water.

14. Concrete according to claim 13, comprising
    6-24% wt. of the cement powder blend of claim 1;
    4-16% wt. water;
    20-50 wt. % fine aggregates (0-4 mm);
    35-60 wt. % coarse aggregates (4-20 mm);
    with the proviso that the total aggregate content is 60-90 wt. %.

15. A product, comprising concrete according to claim 13.

16. Concrete comprising
    6-24 wt. % of a cement powder blend;
    4-16 wt. % water;
    20-50 wt. % fine aggregates (0-4 mm); and
    35-60 wt. % coarse aggregates (4-20 mm);
    with the proviso that the total aggregate content is 60-90 wt. %, wherein the cement powder blend comprises, based on total weight
    45-90 wt. % Portland cement;
    0-25 wt. % siliceous fly ash;
    0-25 wt. % limestone; and
    5-30 wt. % polyvinylalcohol.

17. A product comprising concrete according to claim 16.

18. The product according to claim 17, wherein the product is selected from the group consisting of infrastructural elements, a building, a concrete ware, an an elements for pre-fab buildings.

19. The product according to claim 18, wherein the product is a building, comprising a floor made of said concrete.

20. The product according to claim 18, wherein the product is an infrastructural element selected from the group consisting of a road, a parking terrain, an airplane-landing strip, a railway embankment, a sound barrier wall, and a sewer.

21. The product according to claim 18, wherein the product is a building selected from the group consisting of a parking garage, an industrial building, a storage hall, a retail center, and a residential building.

22. The product according to claim 18, wherein the product is a concrete ware that is a concrete pipe.

23. The product according to claim 18, wherein the product is an element for pre-fab buildings selected from the group consisting of a pre-fab wall, a pre-fab floor, and a pre-fab ceiling.

* * * * *